United States Patent Office 3,561,274
Patented Feb. 9, 1971

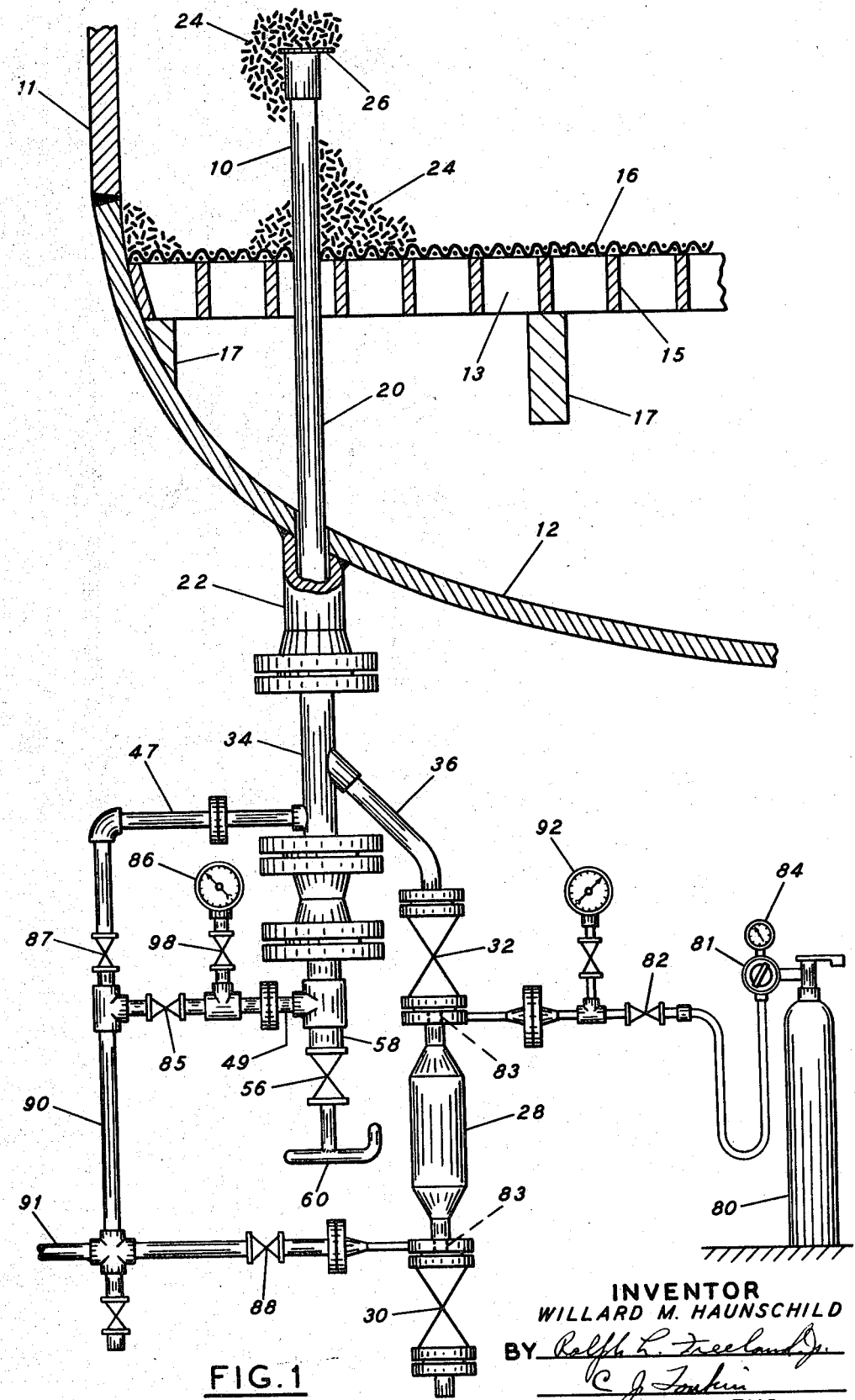

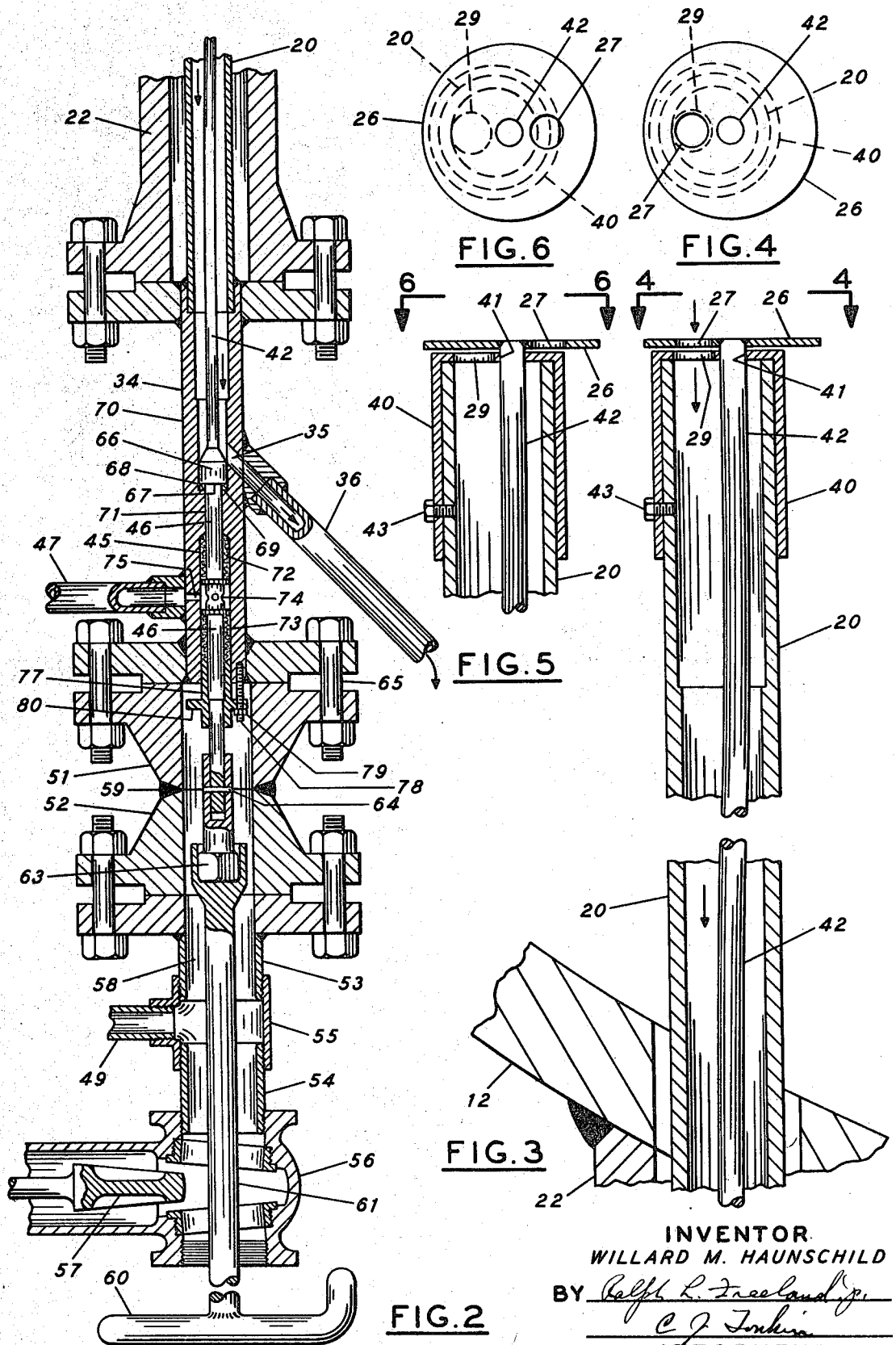

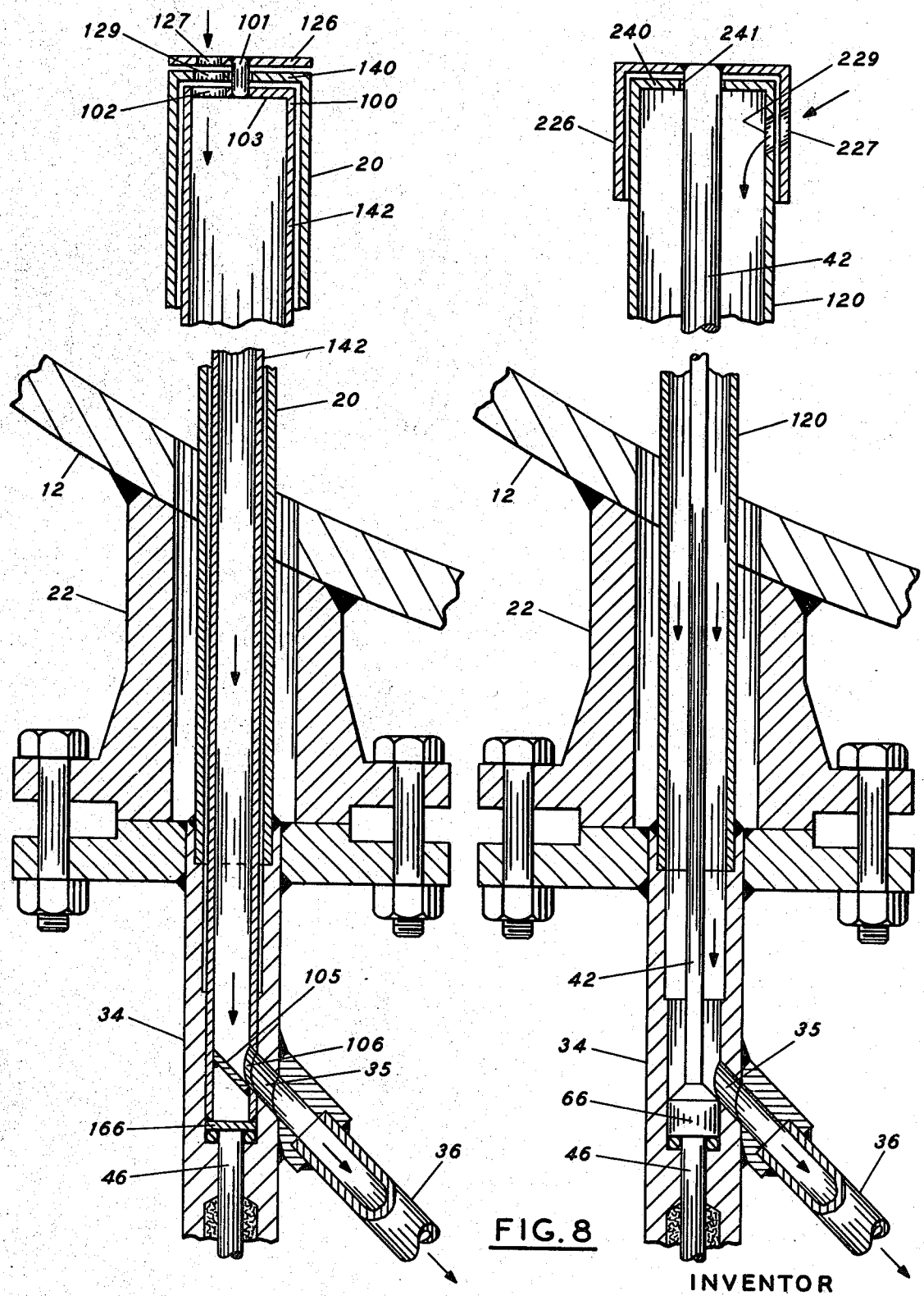

3,561,274
ROTATING DISK CATALYST SAMPLER
Willard M. Haunschild, Walnut Creek, Calif., assignor to Chevron Research Company, San Francisco, Calif., a corporation of Delaware
Filed July 2, 1969, Ser. No. 838,581
Int. Cl. G01n 1/10
U.S. Cl. 73—424
5 Claims

ABSTRACT OF THE DISCLOSURE

The specification describes apparatus for withdrawing a catalyst sample during operation of a catalytic ractor through a sample tube extending to a desired sample point in the reactor. A rotatable member, preferably in the form of a plate or disk, is mounted on the end of a shaft extending through the tube and has a port formed in it that registers at one position with a port in the upper end of the sample tube. A handle turns the shaft so that the disk will mechanically agitate catalyst particles to prevent them from bridging across the ports when they are in register. This assures easy flow into the tube and through space formed by the shaft and tube to an exit port exterior to the vessel. The sample is then caught in a sample receiver. The sample receiver can be isolated from the catalytic reactor to permit the catalyst sample to be recovered without disturbing the catalytic reactor. The system is particularly useful in fixed bed reactors to sample nonspherical catalyst particles that have a relatively high angle of repose.

BACKGROUND OF THE INVENTION

Field of the invention

This invention relates to apparatus for removing particulate solids from a point within a pressure vessel such as a catalytic reactor. More particularly, it relates to a sampler for removing a few catalyst particles having a high angle of repose from a packed bed of catalytic material by mechanical agitation of particles around the sampling point in the vessel to permit gravity flow through an elongated sample tube to a sample chamber outside the vessel.

OBJECTS OF THE INVENTION

It is a particular object of the present invention to provide apparatus for removing catalyst samples from a catalytic reactor vessel operating at non-atmospheric conditions where the catalyst particles are relatively resistant to flow. In a preferred form of apparatus, the upper end of an elongated sample tube is closed by a cover member that serves both as a bearing support for the upper end of a shaft member that is rotatable by a handle outside of the vessel and as an entry port for catalyst particles. A rotatable plate or disk is mounted on the upper end of the shaft above the cover member over the end of the tube so that catalyst particles in the bed and in contact with the plate can be mechanically agitated by rotation of the handle outside the vessel. A complementary port member is formed in the rotating disk to register with the port in the tube end cover. Mechanical agitation of the catalyst particles by rotation of the disk helps prevent bridging of such catalyst particles having poor flow characteristics either at the ports or through the tube so that a suitable sample can be withdrawn. Rotation of the disk so that the ports are out of register closes the tube to stop the sampling operation. Flow space formed by the shaft and the tube permits catalyst particles to flow by gravity downwardly through the tube to an outlet port connected through a valve to a catalyst sample chamber. The exit end of the chamber is also closed by a valve to isolate the sample chamber either at atmospheric, or at catalytic reactor pressure conditions. Such sampling permits examination of catalysts in the reactor vessel while hydrocarbons are being converted under actual catalytic reaction conditions. These conditions frequently involve introduction of high pressure gases, such as hydrogen or heated hydrocarbon streams that prevent ready access to the particle bed.

Further objects and advantages of the present invention will be apparent from the following detailed description, taken in conjunction with the accompanying drawings which form a part of the present specification.

DESCRIPTION OF THE PRIOR ART

It has been known heretofore that catalysts can be removed from a reaction vessel without upsetting the reactor or unduly disturbing the reaction catalyst. Such earlier known sampling systems depend primarily upon freeflow characteristics of the catalyst particles; specifically, most catalysts used heretofore are bead, or ball-type, granules so that their angle of repose (the resistance to flow when stacked in a free-standing pile), is not high. Certain catalysts now in wide use are best produced by extrusion and form cylindrical rods. The rods are then broken to fonm catalyst particles. These rod-like particles frequently vary in length up to about ¼ to ½ inch. While relatively free to roll about their axes, they do not flow readily when stacked. The result is that these rod-shaped particles are not easily released from a packed bed and when released tend to "bridge" together across a conduit or port when an attempt is made to free-flow them into a relatively slender sample tube to a sample "trap" or transfer lock chamber formed in the tube. Even if such catalyst can be moved into such a trap chamber, removal to a receiving or sample chamber may be easily blocked by bridging due to the high angle of repose of the catalyst in the trap. Accordingly, it is difficult to keep a trap-type catalyst sampler operating with such catalyst throughout a catalytic conversion run cycle. Once a sampler is installed it may be several years before the catalyst is unloaded permitting access to the sampler for repairs or unblocking. This places a high premium on reliable jamfree operation. If the sampler becomes inoperative during a run, the plant operator must operate the plant without the guidance provided by data available from catalyst samples, or shut down the reactor, a major processing unit, to repair or unblock the sampler.

BRIEF DESCRIPTION OF THE DRAWINGS

FIG. 1 is a schematic representation of a catalyst sampler system constructed in accordance with the present invention as applied to a fixed bed catalytic reaction vessel.

FIG. 2 is a cross-sectional vertical elevation view of the lower end of the catalyst sampler shown in FIG. 1 that particularly illustrates the construction of the sampler exterior to the reaction vessel.

FIG. 3 is a cross-sectional vertical elevation view of the upper or inner end of the catalyst sampler shown in FIG. 1 and is an upward extension of the unit shown in FIG. 2 to a slightly larger scale.

FIG. 4 is a top plan view of the rotating disk, taken in the direction of arrows 4—4 of FIG. 3.

FIG. 5 is a vertical elevation view, partially in cross section, similar to FIG. 3 illustrating the upper end only of the sampler to show the closed or out of register position of the rotating disk and end cover member.

FIG. 6 is a plan view taken in the direction of arrows 6—6 in FIG. 5.

FIG. 7 is a vertical elevation view, partially in cross-section and similar to FIG. 3, of an alternate form of sampler wherein the rotatable shaft is hollow pipe and concentric with the sample tube so that flow of particle samples is through the center of the pipe.

FIG. 8 is a view similar to FIG. 7 of another embodiment of the present invention wherein the rotatable member is a closed cup with an entry port formed respectively on the cylindrical wall of the cup on the side wall of the sample tube.

DETAILED DESCRIPTION OF PREFERRED EMBODIMENT

Referring now to FIG. 1, rotating disk catalyst sampler 10 of the present invention is shown in its operating relation to a catalyst reaction vessel 11. As indicated, sampler 10 extends vertically into vessel 11 through the opening in flange 22 formed in bottom pressure head 12 and upward through a catalyst support tray 13, indicated as an open grid-work that includes parallel support bars 15, support screen 16 mounted on support members 17 secured to head 12. The arrangement is schematic since the catalyst support tray 13 may also include bubble caps and downcomers, as well as other piping not shown. However, as shown, sample tube 20 of sampler 10 extends upwardly through flange 22 in pressure head 12 and through tray 13 to a desired sample point or elevation where the bed of catalyst particles 24 is deep enough so that sample particles can be taken from a preselected depth in the bed and cover the top of the rotatable member disk 26, mounted above the end of sample tube 20.

Since pressure vessel 11 operates at nonatmospheric temperature and pressure conditions, the system is arranged to permit a catalyst receiving means, such as chamber 28, to be isolated either from the atmosphere or from pressure conditions in vessel 11 by valves 30 and 32. Direct communication to receiving chamber 28 from the inlet to sample tube 20 is through spool 34 secured to header flange 22, side discharge tube 36 and valve 32.

For a more detailed description of the operation of the catalyst sampler, reference is now made to FIGS. 2, 3, and 4. The upper ends of FIG. 3 and FIG. 4 both indicate a preferred construction of rotatable disk 26. In this arrangement a port 27 is formed in one side of disk 26. It is adapted to register with a similar port 29 in end cap 40. Cap 40 also includes a second opening 41 that serves as a bearing member for the upper end of rotatable shaft 42. In the arrangement of FIG. 3 end cap, or cover means, 40 is secured to the upper end of tube 20 by hexagonal head screw 43. Placing bearing 41 somewhat eccentric to the center of cap 40 permits opening 29 to be larger; the slight eccentricity of shaft 42 is easily accommodated by the length and relative flexibility of shaft 42.

FIGS. 5 and 6 illustrate the closed position of disk 26 in relation to end cap 40. In these views, ports 27 and 29 are out of registration to close tube 20.

FIG. 2 illustrates the lower end of catalyst sampler 10 and indicates a preferred construction of the drive mans for rotating shaft 42 and disk 26 to disturb locally catalyst particles in contact with plate, or disk, 27 and prevent bridging of particles across opening 27. Spool 34 secured to the end flange 22 of pressure vessel 11 encloses a packing arrangement 45. Packing 45 is below side discharge line 36 through which catalyst particles falling through tube 20 pass by gravity to receiving chamber 28. Desirably, this side discharge is at a relatively high angle. In the present embodiment it is about 45° to help prevent bridging of particles passing to chamber 28.

For purposes of safety, since in general reactions carried out in vessel 11 use gases that are noxious, explosive, or both, packing arrangement 45 may be checked for leakage. Access to drive nut 63 for shaft 42 is isolated so that in case of failure of packing 45 the leak can be contained by chamber 58. Corrections to tighten packing 45 can be made after releasing the pressure at lantern ring 74. For this purpose, a side tap 47 is connected directly to the center of packing arrangement 45. Similarly, a side tap 49 is connected to chamber or space 58 formed by (a) a pair of flanges 51 and 52 welded together, as at 59, (b) nipples 53 and 54, (c) T 55 and (d) gate valve 56, all connected to the lower end of spool 34 by bolts 65. As indicated, side tap 49 is connected through T 55 and valve 98 to gage 86 that indicates the pressure in chamber 58, closed after removal of drive handle 60 including shaft 61 from engagement with nut 63. As shown, nut 63 is connected through pin 64 to the lower end of drive shaft 42. With handle 61 removed, the ram 57 of gate valve 56 may be closed to form isolation chamber 58.

Construction of packing 45 and drive shaft extension 46 is as follows: The lower end of rod 42 ends in a thrust bearing member 66 that includes shoulder 67 adapted to seat on thrust washer 68 and thrust bearing surface 69 formed in spool stem 70. This bearing surface lies directly above journal bearing 71 also formed by spool stem 70 and directly above stuffing box, or packing 45. This stuffing box includes upper packing 72 and lower packing 73 separated by spool or lantern ring 74. The purpose of ring 74 is to form an open space to communicate with port 75 connected to test line 47. To pack assembly 45, upper packing 72 and lower packing 73 are compressed by packing gland 77 engaging both shaft extension 46 and the inner diameter of spool stem 70. Packing gland 77 is pushed inwardly by nut 79 on stud 78 engaging flange 80 of packing gland 77.

PREFERRED MODE OF OPERATION OF THE ROTATING DISK CATALYST SAMPLER

As discussed above, it is desirable in the operation of a hydrocarbon conversion system to sample the catalyst particles as safely as possible. In the arrangement of FIG. 1 nitrogen or other inert gas is piped to various parts of the system so that combustible fluids trapped in sample receiver 28 or access chamber 58 can be displaced by the inert gas. A tank of nitrogen 80 including the usual pressure regulator 81 and pressure gauge 84 are connected through distributor valve 82 to the top of sample chamber 28 through a filter screen 83 below inlet valve 32 that prevents catalyst from entering the nitrogen system.

When a sample of catalyst 24 in vessel 11 is desired, the pressure conditions in chamber 58 are first checked by closing gate valve 56 with operating handle 60 and its associated stem removed from chamber 58. Also for this purpose, valve 85 is closed and pressure read on gauge 86. With all of the valves closed, as is conventional with the sampler out of use, any pressure in catalyst sampler actuating chamber 58 is due to leakage through packing gland 77 while the system was out of service. If the pressure at gage 86 is zero (no leakage indicated), the sample proceeds. However, if gage 86 shows no pressure, then valve 85 is opened to exhaust chamber 58 through line 90 and blow down line 91. Valve 85 is then closed and the rate of pressure rise noted on gauge 86. If the rate indicates a leak that cannot be safely vented to atmosphere, then valve 87 is opened to vent the packing gland to blow down at spool, or lantern ring, 74. This temporarily stops leakage through lower packing 73 so that packing gland 77 can be tightened by turning nut 79 to press flange 80 upward to compress lower packing 73, and through ring 74, upper packing 72.

At the beginning of sample taking, the pressure in sample receiver 28 is checked by pressure gauge 92. Any pressure buildup in chamber 28 is released to blow down through valve 88. Valve 88 is then closed and valve 82 opened to permit pressurization of chamber 28 with nitrogen. The nitrogen is then released through valve 88 and valve 88 again closed. Valve 82 is then opened to pressure chamber 28 to approximately the pressure existing in reactor 11 and then valve 82 is closed. Catalyst inlet valve 32 is then opened to permit receiver 28 to equalize pressure with vessel 11. This also drains any reaction condensate that may have collected above inlet valve 32 in line 36 when the system was out of operation. Inlet valve 32 is closed and pressure control valve 88 opened releasing pressure and condensation in receiver 28 to blow down. Nitrogen inlet valve 82 is then opened to purge receiver 28 with nitrogen with valve 88 open. Valve 30 is then opened and receiver 28 rapped sharply to dislodge any catalyst particles remaining from previous use. Valves 30 and 88 are then closed. Chamber 28 is then pressured with nitrogen to approximately the pressure existing in reactor 11 and then valve 82 is closed. The system is then ready for the actual catalyst sample.

First, catalyst inlet valve 32 is again opened to equalize pressure of receiver 28 and reactor 11 and chamber access valve 56 opened by withdrawing ram 57 to permit insertion of the operating shaft 61 to drive rotatable shaft 42 and disk 26. From an initial closed position, as shown in FIG. 6, handle 60 is rotated 180° to register ports 27 and 29 in their open position, as shown in FI.G 3. Catalyst will flow downward in the space between tube 20 and shaft 42 and then drop through side outlet 35 in spool 34 and line 36 into chamber 28. If the catalyst becomes stuck or bridges openings 27 and 29, handle 60 is rotated or oscillated to temporarily upset the stable condition of the catalyst to permit free flow into the sampler. At the conclusion of the sampling period of a few seconds, shaft 60 is again rotated 180° to its closed position and inlet valve 32 closed. Pressure control valve 88 is opened releasing the pressure in chamber 28. Additionally, valve 82 may be opened to flow nitrogen through the bottle to purge it of hydrocarbons and cool the sample. The sample is then removed through valve 30. The system is then closed down by removing handle 60 and closing valve 56, as well as valves 82, 30, and 88.

In withdrawing a sample from the reactor, some care must be taken that too large a sample is not trapped in receiver 28 so that catalyst particles block valve 32. To avoid such a difficulty, if chamber 28 is overfilled and sample backs up into valve 32, it is desirable that valve 32 be a plug valve. Experience has shown that a valve of this type can be closed off while the line and valve are full of catalyst particles.

ALTERNATE EMBODIMENTS OF THE INVENTION

While the foregoing embodiment is a preferred form of the invention, certain modifications and changes can be made in the structure of the catalyst sampler. For example, as shown in FIG. 7 the rotatable shaft 42 of FIG. 3 may be formed as a hollow cylinder or pipe 142 that closely fits the internal diameter of tube 20. In such an arrangement the upper end 100 terminates in a face plate 103 within end 140, with a stub shaft 101 extending above end 140 to engage a rotating disk or plate 126. The stationary port 129 is thus under rotating plate 126. A similar port 102 in face plate 103 underlies and rotates with port 127 in plate 126. The primary requirement of the arrangement is only that a plate surface, such as that of disk 26 of FIG. 3 or 126 of FIG. 7 regulate the flow of catalyst into the sampler and mechanically agitate the catalyst to prevent bridging of the ports by particles that have a high angle of repose and consequent resistance to flow. The lower end of hollow shaft 142 ends in a deflection plate 105 that is opposite a port 106 formed above thrust bearing 166.

FIG. 8 is a further alternate to the structural embodiments shown in FIGS. 3 and 7. In this arrangement ports 229 and 227 are formed respectively in the side wall of sample tube 120 and a rotatable cup member 226. In other respects the arrangement of FIG. 8 is similar to FIG. 3 except that bearing hole 241 is in the center of end cover 240 so that cup 226 rotates concentrically about tube 120.

What is claimed is:

1. Apparatus for removing a sample of particulate material relatively resistant to flow from a packed bed of said material in a vessel operating at non-atmospheric pressure and temperature conditions which comprises an elongated sample tube extending into said vessel to an end positioned at a given sampling point in said packed bed of particulate material, said tube forming an elongated flow path between a sample receiving chamber and said sampling point, a rotatable member mounted over the upper end of said tube, said rotatable member having a port formed therein, a shaft connected to said rotatable member and extending through said tube to a point exterior of said vessel, means for rotating said shaft, said tube forming a flow path for sample particles entering said tube through said port in said rotatable member, means forming a complementary port means in the upper end of said tube and adapted to register with said port in said rotatable member, sample receiving means for temporary storage of catalyst particles flowing out of said vessel through said sample tube when said ports in said rotatable member and said upper end of said tube are in register by rotation of said shaft, and means for isolating said sample receiving means selectively for connection to said vessel or to the atmosphere while said vessel is operating under reaction conditions for withdrawal of particles from said bed.

2. Apparatus in accordance with claim 1 wherein said rotatable member is a disk and said ports are respectively formed in the surface of said disk and in an end cover for said tube.

3. Apparatus in accordance with claim 1 wherein said rotatable member is a cup and said ports are formed respectively in the side wall of said cup and adjacent the upper end of said tube.

4. Apparatus in accordance with claim 2 or 3 wherein said shaft is a rod whose diameter is small relative to said sample tube to form an annular flow space for catalyst particles.

5. Apparatus in accordance with claim 2 or 3 wherein said shaft is a pipe member concentric with said tube with said pipe member forming the main flow path through said sample tube.

References Cited
UNITED STATES PATENTS

| | | | |
|---|---|---|---|
| 2,615,339 | 10/1952 | Holgersson et al. | 73—423 |
| 2,688,877 | 9/1954 | Peine | 73—425.4 |
| 3,129,590 | 4/1964 | Ellis | 73—424 |
| 3,348,419 | 10/1967 | Addison | 73—424 |

S. CLEMENT SWISHER, Primary Examiner